United States Patent
Kawai et al.

(10) Patent No.: US 8,628,103 B2
(45) Date of Patent: Jan. 14, 2014

(54) VEHICLE HANDLEBAR SUPPORT STRUCTURE

(75) Inventors: Hideaki Kawai, Kakogawa (JP); Mitsuru Kobayashi, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 13/312,829

(22) Filed: Dec. 6, 2011

(65) Prior Publication Data

US 2012/0160054 A1 Jun. 28, 2012

(30) Foreign Application Priority Data

Dec. 27, 2010 (JP) .................. 2010-289523

(51) Int. Cl.
*B62K 21/12* (2006.01)
*B62K 21/18* (2006.01)

(52) U.S. Cl.
USPC ........ 280/280; 280/288.4; 180/219; 74/551.8

(58) Field of Classification Search
USPC .............. 280/276, 279, 280, 288.4; 180/219; 74/551.1, 551.2, 551.8
See application file for complete search history.

(56) References Cited

U.S. PATENT DOCUMENTS

| 4,687,072 | A * | 8/1987 | Komuro ........................ 180/219 |
| 6,688,175 | B2 * | 2/2004 | Ogura et al. .................... 73/493 |
| 7,681,681 | B2 * | 3/2010 | Satake et al. .................. 180/219 |
| 7,766,360 | B2 | 8/2010 | Saitou et al. |
| 2002/0041077 | A1 | 4/2002 | Hideo et al. |
| 2005/0000747 | A1 | 1/2005 | Richlen et al. |
| 2008/0023244 | A1 | 1/2008 | Saitou et al. |
| 2008/0054138 | A1 | 3/2008 | Ieda et al. |

FOREIGN PATENT DOCUMENTS

| CN | 1346767 | 5/2002 |
| CN | 2827864 | 10/2006 |
| JP | 2006-021627 | 1/2006 |
| JP | 2008024290 | 2/2008 |

OTHER PUBLICATIONS

European Patent Application No. 11010026.0 Extended European Search Report dated Mar. 6, 2012, 7 pages.
Chinese Application No. 201110432002.4 Office Action dated May 13, 2013, 13 pages w/partial English translation.

* cited by examiner

*Primary Examiner* — Kevin Hurley
*Assistant Examiner* — Marc A Scharich (57) ABSTRACT

A handlebar support structure for sandwiching a steering handlebar (12) between a lower holder (25) and an upper holder (28) includes an instrument mounting area (30) for supporting an instrument panel unit (14) fitted removably thereto and a shield mounting area (32) for supporting a windshield (16) fitted removably thereto. The instrument mounting area (30) and the shield mounting area (32) are formed integrally with each other. The instrument mounting area (30) and the shield mounting area (32) altogether represent a forwardly pursed shape along a direction conforming to a forwardly tilted direction (D).

22 Claims, 10 Drawing Sheets

VEHICLE HANDLEBAR SUPPORT STRUCTURE

CROSS REFERENCE TO THE RELATED APPLICATION

This application is based on and claims Convention priority to Japanese patent application No. 2010-289523, filed Dec. 27, 2010, the entire disclosure of which is herein incorporated by reference as a part of this application.

BACKGROUND OF THE INVENTION

1. Field of the Invention

The present invention relates to a vehicle handlebar support structure for supporting a steering handlebar in a sandwiched fashion between a lower holder and an upper holder in an automotive vehicle.

2. Description of Related Art

It is known that in an automotive vehicle such as, for example, a motorcycle, a lower holder is mounted on a top bridge (upper bracket) on an upper end of a front fork, and a steering handlebar is, after having been mounted on this lower holder with an upper holder mounted over the handlebar, firmly sandwiched between the lower holder and the upper holder for movement together with the front fork to thereby complete the firm mounting of the steering handlebar on a motorcycle frame structure. On the other hand, it is also known that various gauges such as, for example, a speed meter and a tachometer are arranged in the vicinity of the steering handlebar and are supported on the top bridge, the lower holder or the upper holder through respective brackets. In this respect, see the Japanese Laid-open Patent Publication No. 2008-24290.

It has, however, been found that the vehicle handlebar support structure disclosed in the above mentioned patent document requires the use of brackets for the support of the various gauges and, accordingly, not only does the number of component parts tend to increase, but the structure becomes also complicated, resulting in an undesirable increase of the weight of the motorcycle as a whole.

SUMMARY OF THE INVENTION

In view of the foregoing, the present invention has been devised to substantially eliminate the problems and inconveniences inherent in the related art vehicle handlebar support structure and is intended to provide an improved vehicle handlebar support structure simplified and reduced in weight with the number of component parts having been reduced enough to realize a reduction in cost.

In order to accomplish the foregoing objects of the present invention, there is provided a handlebar support structure for sandwiching a steering handlebar between a lower holder and an upper holder, in which the upper holder is formed integrally with an instrument mounting area for removably supporting an instrument panel unit fitted thereto and a shield mounting area for removably supporting a windshield fitted thereto. Attention is called that "the upper holder is integrally formed with an instrument mounting area and a shield mounting area" referred to above is to be understood as meaning that the upper holder is of one-piece construction including the instrument mounting area and the mounting areas that are inseparable from each other.

According to the above described construction, since the instrument mounting area and the shield mounting area are formed integrally with the upper holder, the number of component parts used is reduced and, the structure is simplified, resulting in a reduction in weight and in cost. Also, when the instrument panel unit is fitted to the upper holder, it is possible to increase the visibility while bringing it close to a riser or a driver as compared with the conventional case.

In a preferred embodiment of the present invention, the instrument mounting area and the shield mounting area altogether may represent a forwardly pursed shape when along a direction conforming to a predetermined forward tilted direction. According to this construction, the upper holder can be formed by any known molding technique with the use of two separable molds of a simplified structure and the productivity is therefore increased.

In another preferred embodiment of the present invention, the instrument mounting area may have a boss with which the instrument panel unit is screwed from above, in which case the shield mounting area is positioned above the boss and has a cutout defined therein for passage of a tool therethrough for handling a screw. According to this construction, since the tool can make an easy access via the cutout formed in the shield mounting area to the boss in the instrument mounting area to connect the instrument panel unit with the fastening members, the workability in fitting the instrument panel unit is enhanced. Also, after the mounting of the instrument panel unit, fitting the windshield to the shield mounting area is effective to cover the shield mounting area and its surroundings from above with the windshield and, therefore, there is no possibility that the appearance of the motorcycle may be deteriorated.

In a further preferred embodiment of the present invention, the instrument mounting area may have a to-be-engaged portion engageable with an engagement, provided in the instrument panel unit, when such an engagement is inserted from a direction perpendicular to a display surface of the instrument panel unit. In such case, the to-be-engaged portion is preferably engageable with the engagement through a damper. According to this construction, merely by inserting the engagement, the instrument panel unit can be regulated in position and, therefore, the workability in fitting the instrument panel unit increases.

In a still further preferred embodiment of the present invention, the instrument mounting area may have an instrument panel mounting surface having its entire surface covered by the instrument panel unit. According to this construction, since the surface in its entirety is covered by the instrument panel unit, no mounting surface will be exposed to the outside and, therefore, there is no need to conduct a work of removal of fins or burrs present in the mounting surface, thus increasing the productivity.

In a yet further preferred embodiment of the present invention, the shield mounting area may form a covering mounting area on which the covering member is fitted. According to this construction, due to the concurrent use of the shield mounting area and the covering mounting area, the structure can be simplified.

Where the covering member is fitted, the shield mounting area may have a rear end face that is covered by the covering member. According to this construction, since the rear end face of the shield mounting area is covered by the covering member, there is no need to conduct a work of removal of fins or burrs from the shield mounting area, accompanied by an increase of the productivity.

The present invention in accordance with another aspect provides an automotive vehicle equipped with the handlebar support structure having the covering member fitted thereto, in which the instrument panel is mounted on the instrument mounting area and the windshield and the covering member being fitted to the shield mounting area by means of common fastening members. According to the above construction, since the instrument mounting area and the shield mounting area are formed integrally with the upper holder, the number of component parts used is reduced, the structure is simplified and the weight is reduced. Also, since the windshield and the covering member are fitted to the shield mounting area by means of the common fitting members, the structure is further simplified.

In the automotive vehicle of the kind referred to above, the handlebar support structure is preferably provided on a top bridge at a front fork upper end portion and the gauge may be, when viewed from side, arranged on a line of extension of the front fork. The wording "the instrument panel unit is arranged on the line of extension of the front fork" as quoted above should be understood as meaning that the line of extension of the front fork assembly extends through a part of the instrument panel unit. According to the construction described above, although the instrument panel unit moves together with the handlebar, the weight is reduced as a result of the reduction in number of component parts used and, also, the instrument panel unit is arranged above the front fork, resulting in the moment of inertia during the handlebar being maneuvered smaller. Therefore, the handleability of the handlebar can be sufficiently secured and, at the same time, since the instrument panel unit is brought close to a rider or a driver, the visibility of the instrument panel unit increases.

It is to be noted that any combination of at least two constructions disclosed in the claims and/or the specification and/or the accompanying drawings are to be construed as included within the scope of the present invention. In particular, any combination of two or more of the appended claims is also to be construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
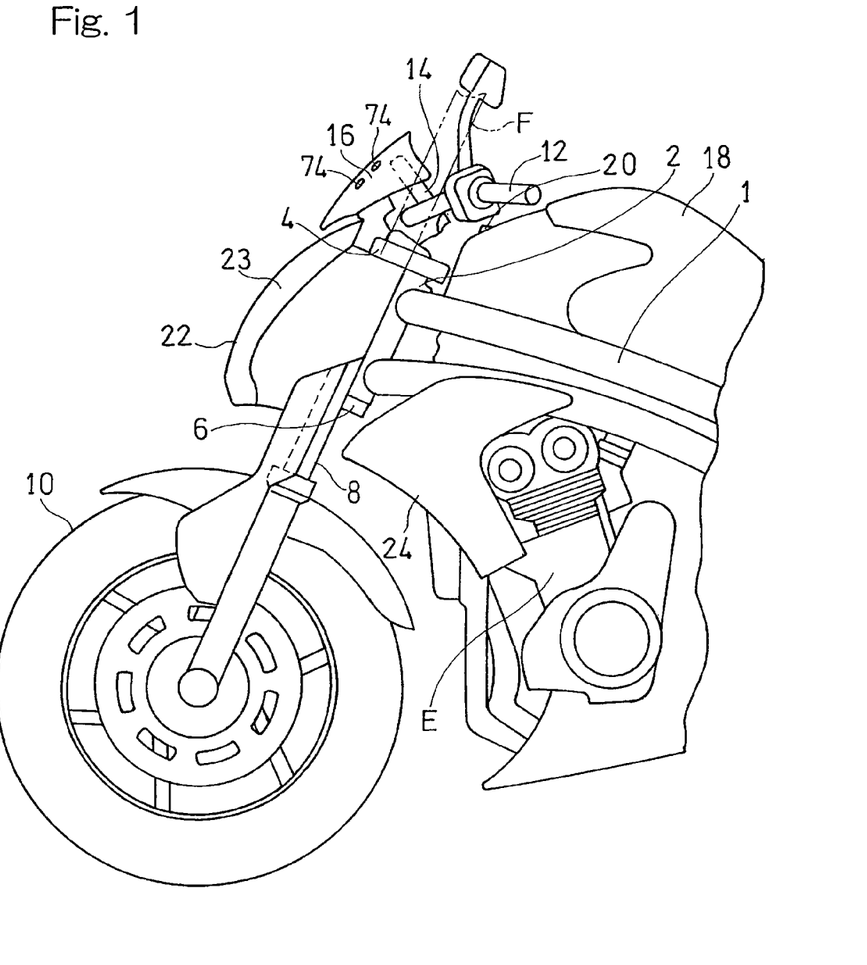
FIG. 1 is a left side view showing a front portion of a motorcycle equipped with a handlebar support structure designed in accordance with a preferred embodiment of the present invention.

Hereinafter, a preferred embodiment of the present invention will be described in detail with reference to the accompanying drawings. FIG. 1 illustrates a front portion of a motorcycle, which is one of automotive vehicles to which the present invention is applicable, which portion is equipped with a vehicle handlebar support structure according to this embodiment of the present invention. As shown therein, a head pipe 2 is mounted on a front end portion of a main frame 1, which forms a part of a frame structure of a motorcycle; a steering shaft (not shown) is rotatably passed through the head pipe 2; and a top bridge or an upper bracket 4 and a bottom bridge or a lower bracket 6 are connected with the steering shaft. A front fork assembly including two fork tubes, which assembly is generally identified by 8, is supported by the top bridge 4 and the bottom bridge 6, and a front wheel 10 is rotatably supported by a lower end portion of the front fork assembly 8.

With the utilization of a handlebar support structure as will be described in detail subsequently, a steering handlebar 12, an instrument panel unit 14 including various gauges such as, for example, a speed meter and an engine tachometer, and a windshield 16 are mounted on the top bridge 4. The instrument panel unit 14 is arranged on the line of extension F of the front fork assembly 8 when viewed from side. It is to be noted that "the instrument panel unit 14 is arranged on the line of extension F of the front fork assembly 8" as quoted above means that the line of extension F of the front fork assembly 8 extends through a part of the instrument panel unit 14. In the illustrated embodiment, the windshield 16 is employed in the form of a small sized windshield that looks like a meter visor, but it may alternatively be employed in the form of a large sized windshield.

A motorcycle combustion engine E is mounted on a lower region of the main frame 1 and a fuel tank 18 is mounted on an upper region of the main frame 1. An ignition switch 20 is disposed substantially intermediate between the fuel tank 18 and the handlebar 12. According to such an arrangement as described above, the ignition switch 20 is disposed at a location close to a motorcycle rider as compared with the positioning of the ignition switch at a location forwardly of the top bridge 4, and, therefore, the accessibility of the ignition switch 20 increases. Also, a front cowl 22 made of a resinous material is mounted on a front portion of a motorcycle body so as to enclose an area forwardly of the head tube 2 with respect to the direction of forward travel of the motorcycle and left and right side cowls 24 are supported respectively by opposite lateral sides of the front portion of the motorcycle body. A headlight device 23 is mounted on the front cowl 22.

Figure 2:
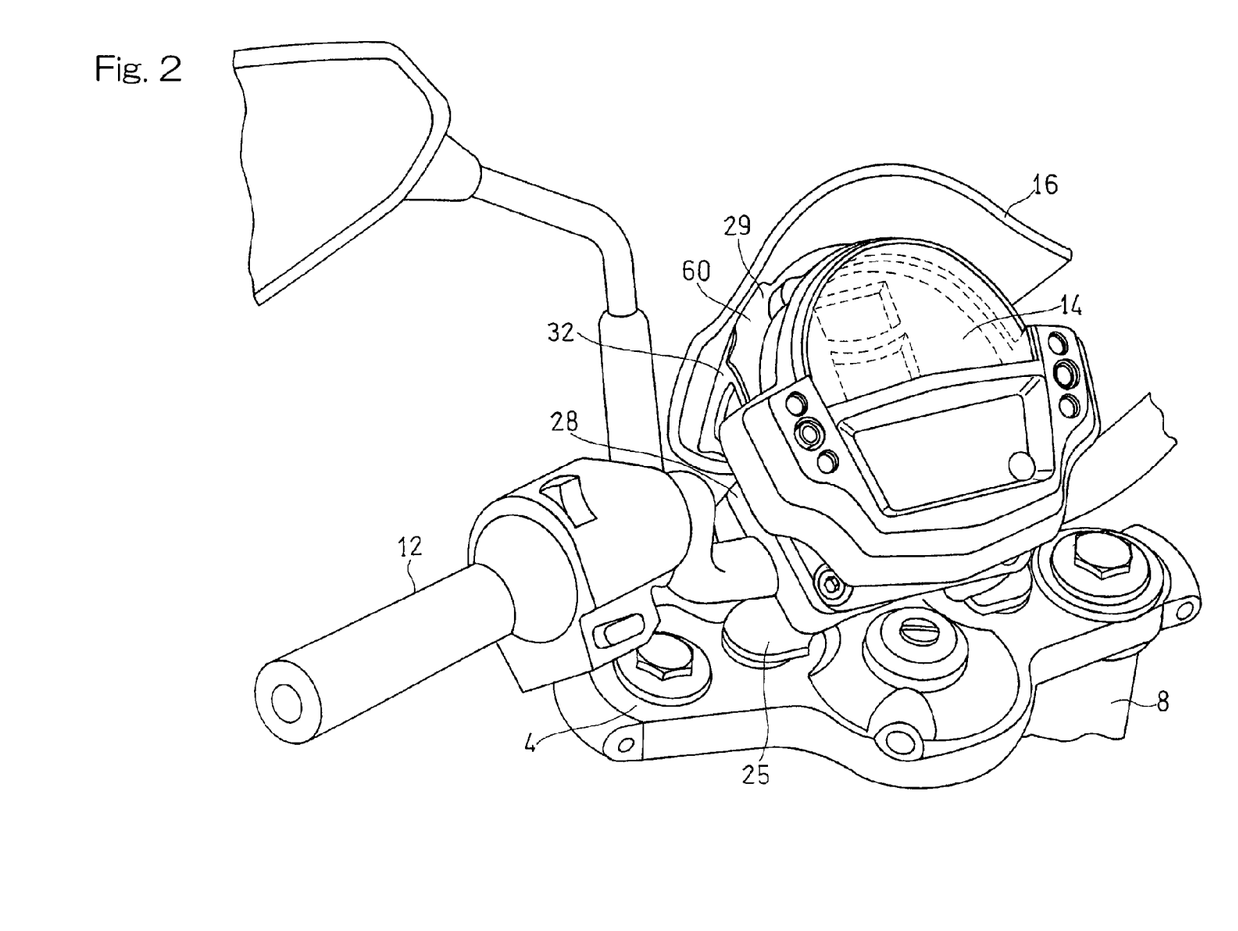
FIG. 2 is a rear perspective view showing an area of the motorcycle in the vicinity of the steering handlebar.
Figure 4:
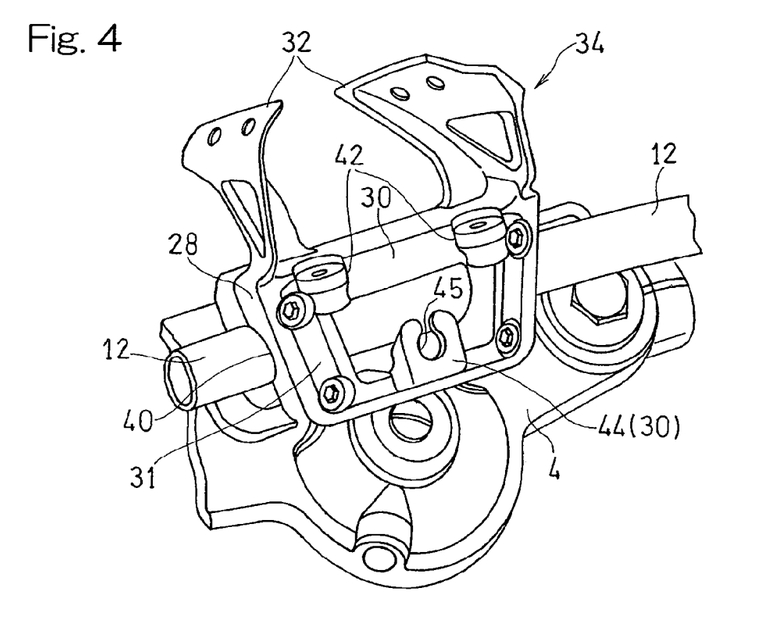
FIG. 4 is a perspective view showing the area of the motorcycle in the vicinity of the steering handlebar after the upper holder forming a part of the handlebar support structure has been mounted.

Referring to FIGS. 2 and 4, the steering handlebar 12 is mounted on the top bridge 4, that is, the motorcycle body while having been sandwiched between left and right lower holders 25, fitted to the top bridge 4, and an upper holder 28 which is a member separate from the lower holders 25. The upper holder 28 has disposed therein the gauges 14, the windshield 16 and a harness covering 29 all best shown in FIG. 2.

Figure 3:
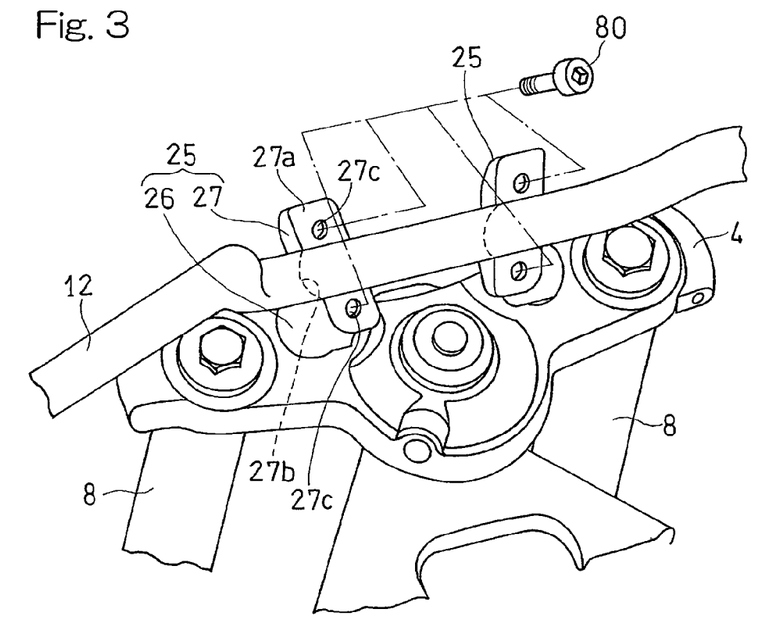
FIG. 3 is a perspective view showing the area of the motorcycle in the vicinity of the steering handlebar before an upper holder forming a part of the handlebar support structure is mounted.

As shown in FIG. 3, the left and right lower holders 25 and 25 are juxtaposed in a side-by-side fashion relative to each other between portions of an upper surface of the top bridge 4 at which portions the two tubes of the front fork assembly 8 are supported. Each of the lower holders 25 is made up of a body connecting area 26, supported by the top bridge 4, and a handlebar support unit 27 for supporting the steering handlebar 12. The body connecting area 26 of each of the lower holders 25 has a stud bolt (not shown) embedded in a lower portion thereof, such that when a nut (not shown) is firmly fastened to the stud bold from below of the top bridge 4 while the latter has been inserted through a throughhole (not shown) defined in the top bridge 4, the associated lower holder 25 can be supported by the motorcycle body. It is, however, to be noted that the manner of support of the lower holders 25 may not be necessarily limited to that described above.

The handlebar support unit 27 of each of the lower holders 25 has a flat mounting surface 27a defined therein and inclined at a certain angle relative to the horizontal datum in a direction rearwardly upwardly of the motorcycle body, and a handlebar support recess 27b defined in a generally vertically intermediate portion of this flat mounting surface 27a for receiving therein a generally intermediate portion of the steering handlebar 12. A pair of screw holes 27c and 27c for each of the lower holders 25 are upper and lower portion of the flat mounting surface 27a on respective sides of that intermediate portion of the handlebar support recess 27b.

Figure 5:
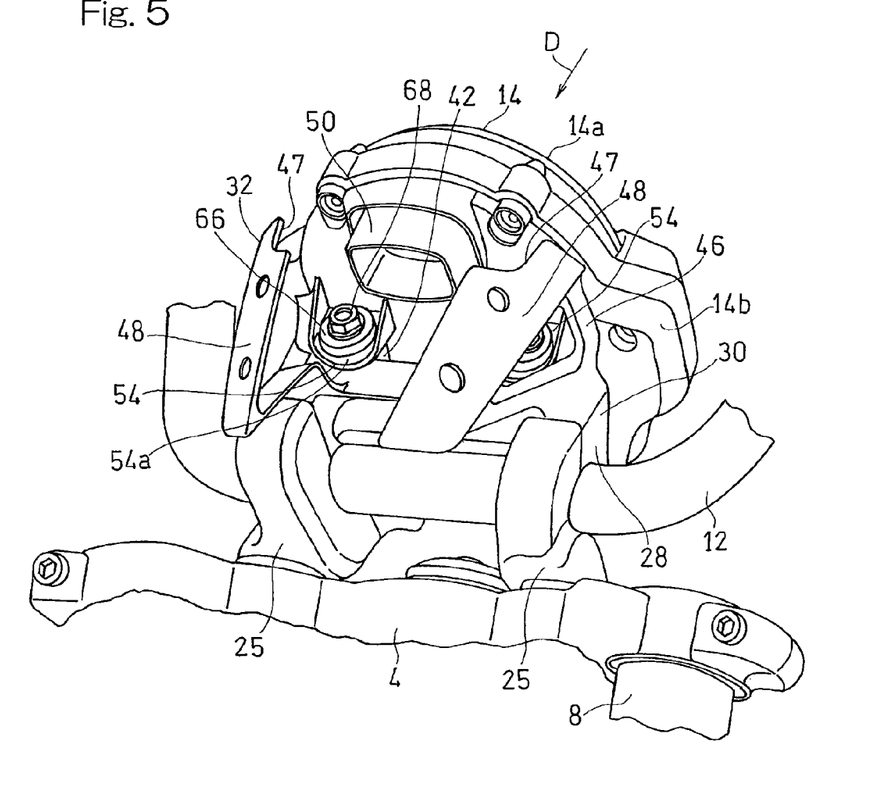
FIG. 5 is a front perspective view showing the area of the motorcycle in the vicinity of the steering handlebar.

Referring now to FIG. 5, the upper holder 28 is integrally formed with an instrument mounting area 30 positioned rearwardly of the upper holder 28 and adapted to support the instrument panel unit 14 that is removably mounted thereon, and left and right shield mounting areas 32 positioned upwardly of the upper holder 28 and adapted to support the windshield 16 (best shown in FIG. 2) that is removably mounted thereon. It is to be noted that the wording "the upper holder 28 is integrally formed with instrument mounting area 30 and left and right shield mounting areas 32" referred to above means that the upper holder 28 is formed by any known molding technique with the use of a mold assembly to represent one-piece construction including the instrument mounting area 30 and the left and right shield mounting areas 32 that are inseparable from each other.

Figure 6:
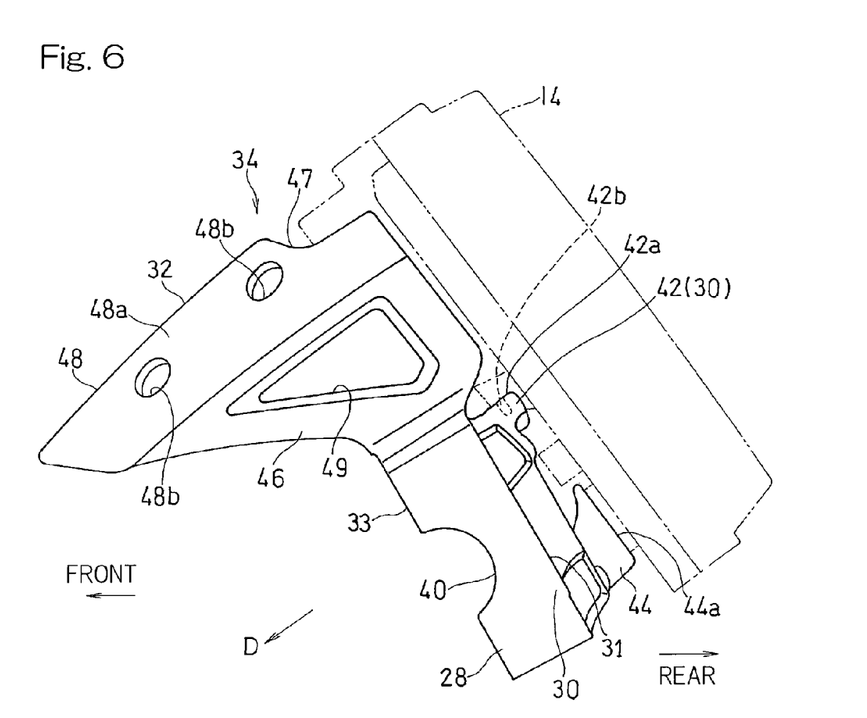
FIG. 6 is a left side view showing a handlebar support substructure.
Figure 7:
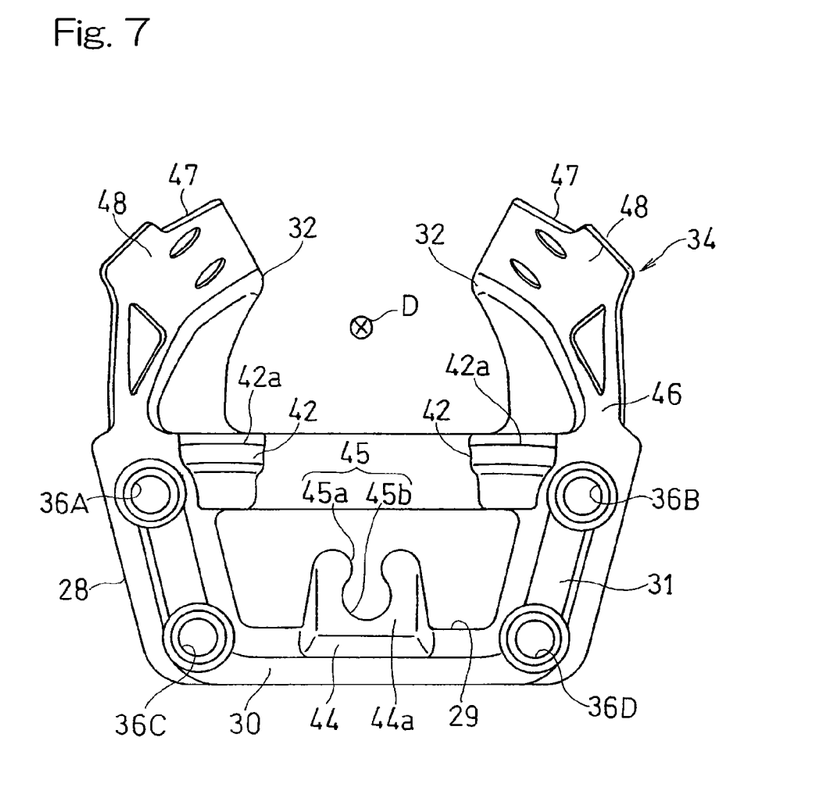
FIG. 7 is a rear view showing the handle support substructure.

FIG. 6 illustrates a side view of the handlebar support block 34 comprised of the upper holder 28, the instrument mounting area 30 and the shield mounting areas 32. The illustrated handlebar support block 34 is, in the instance as shown in connection with the preferred embodiment, molded by means of an aluminum die casting and represents a generally forwardly tilted shape, more specifically, a forwardly downwardly inclined form, when viewed from side. The instrument mounting area 30 and the shield mounting areas 32 represent a forwardly pursed shape, that is, a shape converging toward front, along a predetermined direction indicated by the forwardly downwardly tilted arrow D, As shown in FIG. 7, which is a rear view depicted as viewed in the forwardly downwardly tilted direction D, the upper holder 28 is of a generally inverted trapezoidal shape having a hollow 29 defined therein for the purpose of reducing the weight thereof. The instrument mounting area 30, which is a rear portion of the upper holder 28, has a rear surface 31 diagonally rearwardly upwardly inclined as shown in FIG. 6, and the upper holder 28 has front faces 33 oriented towards in a forwardly downward direction D which is the forwardly downwardly inclined direction referred to above. The rear surface 31 and the front faces 33 lie perpendicular to the forwardly downward direction D and the rear surface 31 forms respective instrument panel mounting surfaces of the instrument mounting area 30. A gap exists between the instrument panel mounting surface 31 and the instrument panel unit 14. Four corner portions of the instrument panel mounting surfaces 31 shown in FIG. 7 are formed with respective bolt insertion holes 36A, 36B, 36C and 36D. The front surface 33 of the upper holder 28 shown in FIG. 6 is formed with a second handle support recess 40 in which that intermediate portion of the steering handlebar 12 best shown in FIG. 2 is engaged. In other words, the front faces 33 forms a handle mounting surface.

Respective portions of the instrument panel mounting surface 31, which is a rear surface of the upper holder 28 as shown in FIG. 7, in the vicinity of the upper two bolt insertion holes 36A and 36B are provided with left and right bosses 42 and 42 which form corresponding parts of the instrument mounting area 30 and 30. Each of the bosses 42 protrudes rearwardly from the instrument panel mounting surface 31 as best shown in FIG. 6 and has a boss face 42a parallel to the forwardly downward direction D. Each of the bosses 42 also has an instrument panel mounting screw hole 42b defined in the corresponding boss face 42a so as to extend in a direction perpendicular to the boss face 42a.

A portion of the rear surface 31 of the instrument mounting area 30 best shown in FIG. 7, which portion is intermediate between the lower two bolt insertion holes 36C and 36D, is formed with a projection 44 protruding rearwardly upwardly. This projection 44 has a diagonally rearwardly upwardly oriented support face 44a lying perpendicular to the forwardly downward direction D shown in FIG. 6, and this support face 44a is provided with a to-be-engaged portion 45 comprised of a guide groove 45a extending downwardly as viewed in FIG. 7 and a round throughhole 45b continued to the guide groove 45a.

The left and right shield mounting areas 32 and 32 in an upper portion of the upper holder 28 have respective connecting pieces 46, extending upwardly from the upper portion of the upper holder 28, and mounting pieces 48 extending diagonally forwardly downwardly from the adjacent connecting pieces 46. The mounting pieces 48 in turn have respective shield mounting faces 48a oriented diagonally outwardly as shown in FIG. 6, and each of the shield mounting faces 48a is formed with two mounting holes 48b extending completely across the corresponding shield mounting face 48a and juxtaposed to each other in a direction forwards and rearwards. Each of the connecting pieces 46 has a wall depleted hole 49 for the purpose of reducing the weight of the upper holder 28 as a whole.

Each of the shield mounting areas 32 is formed with a cutout 47 at an upper portion in the associated mounting piece 48, which portion is positioned above the adjacent boss 42 formed in the corresponding instrument mounting area 30 and lies upwardly of the adjacent boss 42. More specifically, the cutout 47 lies upwardly of the boss 42 along a direction in which the boss face 42a of the adjacent boss 42 is oriented, that is, in a direction perpendicular to the forwardly downward direction D. This cutout 47 is used to pass a screw handling tool therethrough and is formed in a rear portion of each of the shield mounting faces 48a so as to be oriented from inwardly of a motorcycle widthwise direction towards outwardly of the motorcycle widthwise direction.

Figure 8:
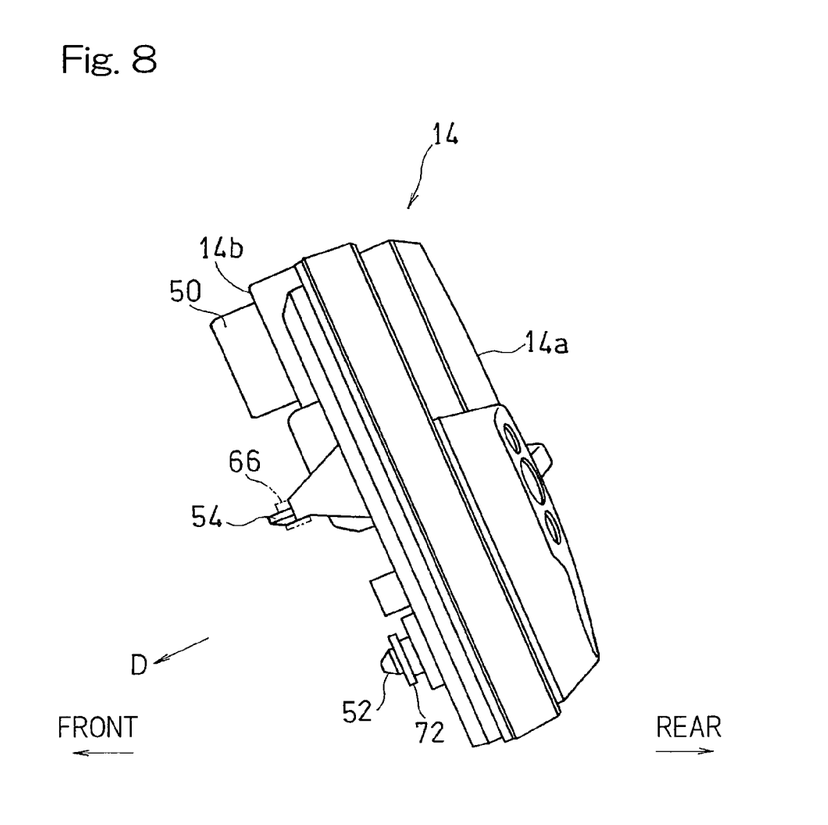
FIG. 8 is a left side view showing an instrument panel.
Figure 9:
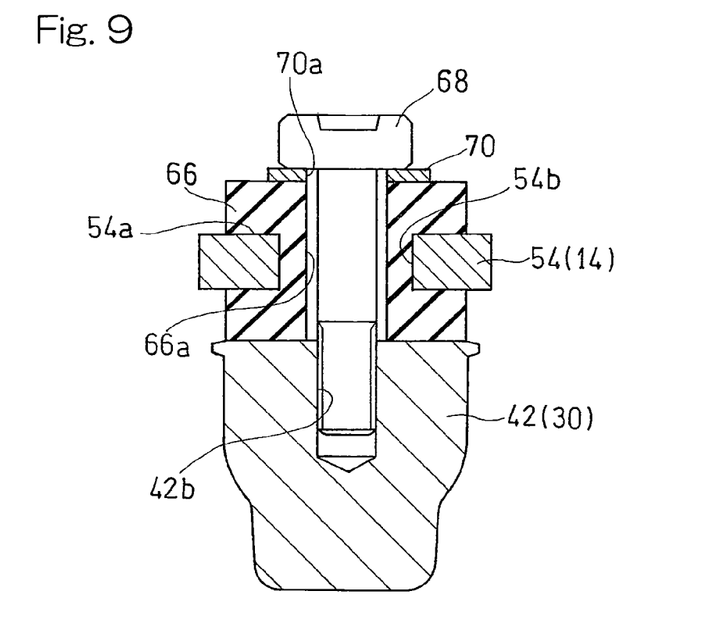
FIG. 9 is a longitudinal sectional view showing an instrument mounting area.

Referring to FIG. 8, the instrument panel unit 14 has a display surface 14a oriented rearwardly upwardly, more specifically in a direction counter to the forwardly downward direction D. The rear surface 14b, which is a rear side of the display surface 14a, has an upper portion, formed with a tubular harness lead-out portion 50 through which a harness (not shown) extends for connection with the gauges, and a lower portion formed with a pin-like engagement 52, engageable with the to-be-engaged portion 45 best shown in FIG. 7, so as to protrude outwardly therefrom. As FIG. 5 makes it clear, the rear surface 14b of the instrument panel unit 14 has left and right mounting pieces 54 formed therein at an intermediate portion thereof in a direction up and down. Each of those mounting pieces 54 has a mounting face 54a oriented upwardly, more specifically, in a direction perpendicular to the forwardly downward direction D, with a bolt insertion hole 54b defined in such mounting face 54a as shown in FIG. 9.

The instrument panel unit 14 referred to previously is fitted to the bosses 42 in the instrument mounting area 30 through respective mount members 66 each made of an elastic material such as, for example, rubber. More specifically, as best shown in FIG. 9, the mount members 66 are inserted in the respective bolt insertion holes 54b defined in the instrument panel unit 14 and fastening members 68 such as, for example, bolts are, after having been passed through insertion holes 70a defined in associated washers 70 and insertion holes 66a defined in the mount members 66, threadingly engaged in the corresponding instrument panel unit mounting screw holes 42b, thereby allowing the instrument panel unit 14 to be supported on and by the instrument mounting area 30.

Figure 10:
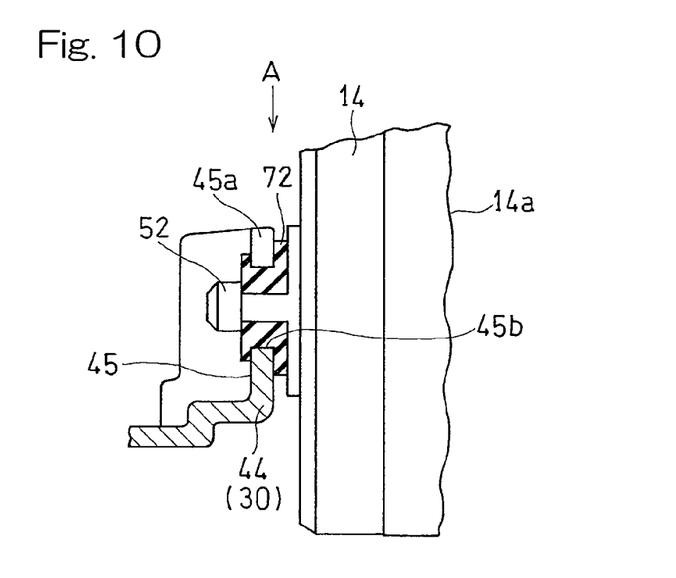
FIG. 10 is a longitudinal sectional view showing an engagement of the instrument panel.

Also, as shown in FIG. 10, the engagement 52 of the instrument panel unit 14 is engaged in a throughhole 45b defined in the to-be-engaged portion 45 of the instrument mounting area 30 through a damper 72 such as, for example, rubber. The engagement 52 is engaged in position when inserted from above into the to-be-engaged portion 45 as shown by the arrow A.

Figure 11:
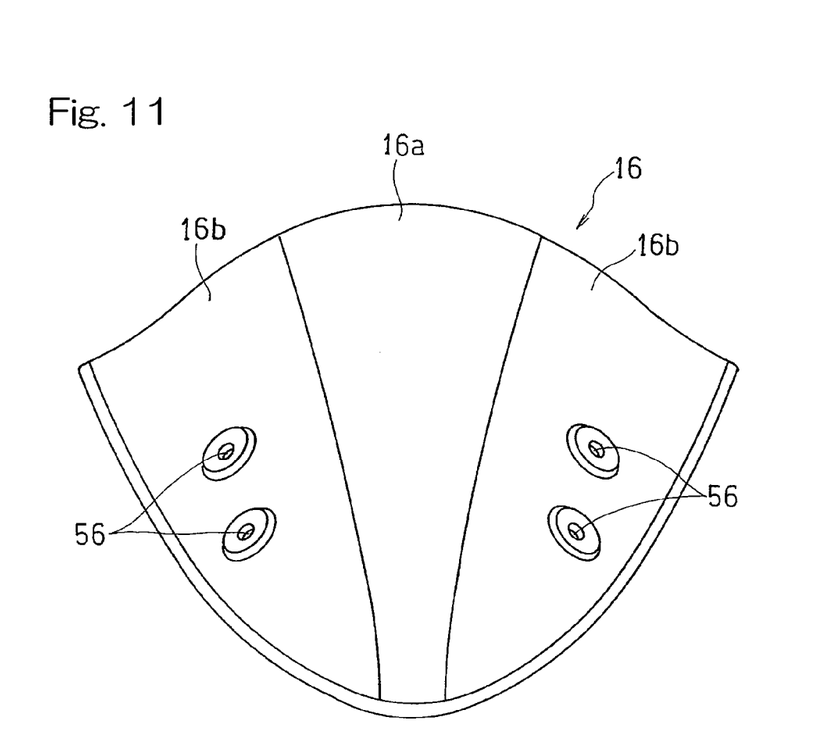
FIG. 11 is a front elevational view showing a windshield.

The windshield 16 best shown in FIG. 1 serves to protect the instrument panel unit 14 and the motorcycle rider from the incoming wind during the travel of the motorcycle and has a portion thereof intermediate of the widthwise direction of the motorcycle, which is so curved as to bulge forwardly upwardly, as best shown in FIG. 11 so that the incoming wind impinging upon the windshield 16 can be guided laterally outwardly of the motorcycle in the widthwise direction of the motorcycle. More specifically, the windshield 16 has defined therein a bulged portion 16a at the intermediate portion thereof in the widthwise direction of the motorcycle and inclined portions 16b and 16b formed in opposite sides thereof in the widthwise direction of the motorcycle and continued from the bulged portion 16a so as to extend diagonally rearwardly. Each of the inclined portions 16b is formed with shield mounting insertion holes 56 and 56 positioned one after another in a direction forwards and rearwards.

Figure 12:
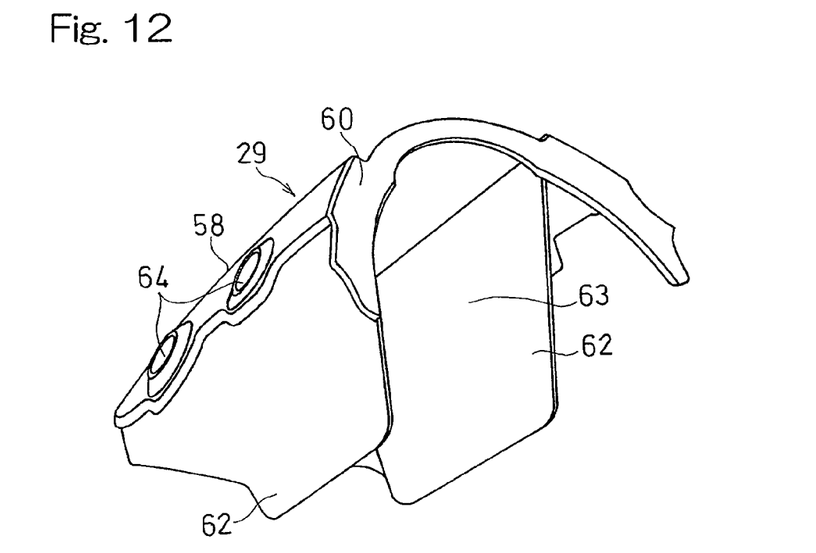
FIG. 12 is a rear perspective view showing a harness covering.
Figure 13:
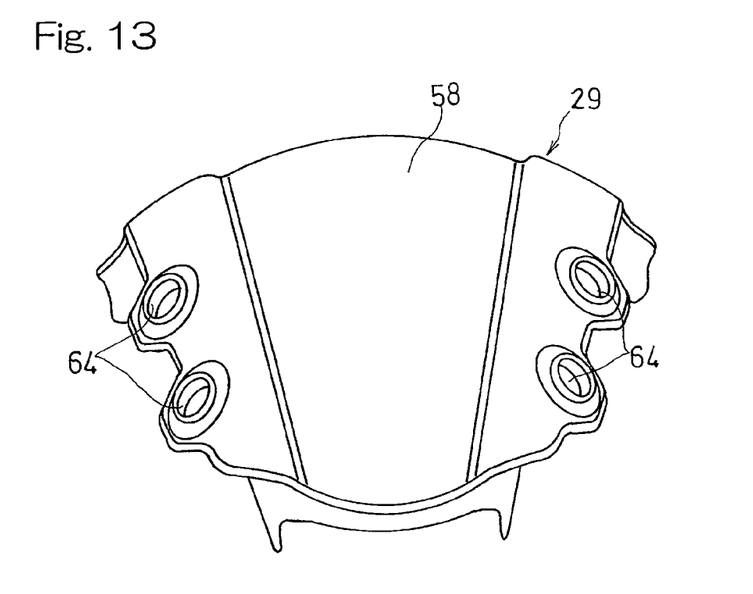
FIG. 13 is a front elevational view showing the harness covering.

As shown in FIG. 12, the harness covering 29 referred to previously has an upper wall 58 so shaped as to follow the windshield 16 best shown in FIG. 11, a rear wall 60 formed in a rear portion of the upper wall 58 so as to protrude downwardly, and left and right side walls 62 and 62 extending downwardly from the upper wall 58. A harness passage 63 is defined by the upper wall 58 and the side walls 62 and 62. As shown in FIG. 13, covering mounting insertion holes 64 are formed in the upper wall 58 at respective portions of such upper wall 58 corresponding to the shield mounting insertion holes 56 in the windshield 16.

Figure 14:
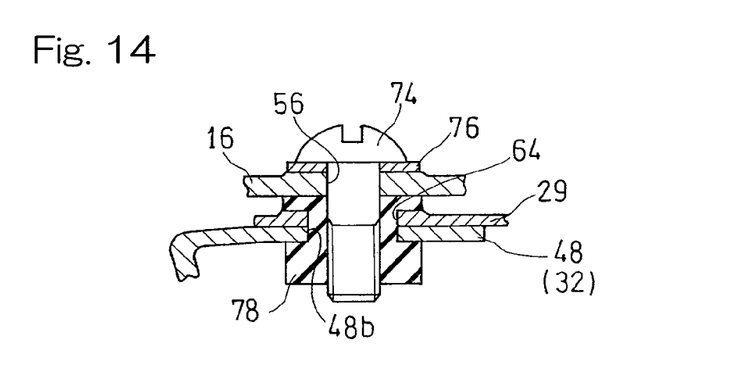
FIG. 14 is a longitudinal sectional view showing a mounting structure for the windshield and the harness covering.

As shown in a longitudinal sectional view in FIG. 14, when the harness covering 29 is overlaid on the mounting piece 48 of each of the shield mounting areas 32; a rubber nut 78 is mounted in the throughhole 48b in the respective mounting piece 48 and also in the associated covering mounting insertion hole 64; while the windshield 16 is overlaid thereabove, a fastening member 74 such as, for example, a bolt is passed through each of washers 76 and the shield mounting insertion hole 56 in the windshield 16; and when the respective fastening member 74 is screwed onto the rubber nut 78, the windshield 16 and the harness covering 29 are supported by the mounting pieces 48 in the shield mounting areas 32 In other words, the shield mounting areas 32 concurrently serve as covering mounting areas for attachment of the harness covering 29 and both of the windshield 16 and the harness covering 29 are concurrently fastened to the shield mounting areas 32 by the fastening members 74, which are common mounting pieces, through the corresponding rubber nuts 78.

Hereinafter, procedures to assembly the handle support block 34 will now be described. After the intermediate portion of the steering handlebar 12 has been mounted on the lower holders 25 with its lower half received in the first handle support recesses 27b defined in the respective lower holders 25 as best shown in FIG. 3, the upper holder 28 is mounted onto the associated lower holders 25 with upper half of the intermediate portion of the handlebar 12 received in the second handle support recess 40 defined in the upper holder 28 as best shown in FIG. 4. Subsequently, bolts 80 best shown in FIG. 3 are successively inserted into the respective bolt insertion holes 36A to 36D, shown in FIG. 7, defined in the upper holder 28 and then firmly threaded into the screw holes 27c defined in the lower holders 25, to thereby allow the handlebar 12 to be sandwiched between the lower holders 25 and the upper holder 28, thus completing the handlebar 12 to be firmly supported by the lower and upper holders 25 and 28.

Thereafter, the instrument panel unit 14 is mounted on the instrument mounting area 30 integral with the upper holder 28. For this purpose, when the damper 72 is mounted on the respective engagement 52 rigid with the instrument panel unit 14 and is moved into the associated throughhole 45b by way of the guide groove 45a in the instrument mounting area 30, the engagement 52 is engaged with the to-be-engaged portion 45 to thereby position the instrument panel unit 14. Subsequently, using the fastening members 68, the mounting pieces 54 of the instrument panel unit 14 best shown in FIG. 5 are fastened to the respective bosses 42 in the instrument mounting area 30. By so doing, the instrument panel unit 14 is supported by the top bridge 4 through the instrument mounting area 30 in a condition with the rubber mount members 66 intervening.

As described above, the instrument panel unit 14 is supported by the top bridge 4, that is, the motorcycle body by means of three rubber mounts 66, 66 and 72 (FIG. 8) with an undesirable transmission of vibrations of the motorcycle body to the instrument panel unit 14 suppressed. Also, with the instrument panel unit 14 mounted on the instrument panel mounting 30 in the manner described above, the instrument panel mounting surface 31, the bosses 42 and the to-be-engaged portions 45 in the instrument mounting area 30 shown in FIG. 4 are covered by the instrument panel unit 14 so mounted.

After the instrument panel unit 14 has been mounted on the instrument mounting area 30 in the manner described above, the windshield 16 best shown in FIG. 11 and the harness covering 29 best shown in FIG. 12 are fitted to the shield mounting portion 32 with the use of the fastening members 74 best shown in FIG. 14. In this condition, the harness lead-out portion 50 integral with the instrument panel unit 14 shown in FIG. 5 is positioned within the harness passage 63 in the harness covering 29 shown in FIG. 12. Also, the neighborhood of the shield mounting area 32 shown in FIG. 2, more specifically a rear end face of the shield mounting area 32 and the gap delimited between the windshield 16 and the instrument panel unit 14 are closed by the rear wall 60 of the harness covering 29. In other words, the rear wall 60 of the harness covering 29 functions as a covering member for covering the neighborhood of the shield mounting area 32.

With the embodiment having been so constructed as hereinbefore fully described, the instrument mounting area 30 and the shield mounting area 32, both best shown in FIG. 4, are formed integrally with the upper holder 28 to thereby form the handlebar support block 34 and, therefore, not only is the number of component parts reduced to simplify the structure and to reduce the weight. As a result, the cost of manufacture is also reduced.

Since as shown in FIG. 7 the instrument mounting area 30 and the shield mounting area 32 are of the forwardly pursed shape in the direction along the predetermined forwardly downwardly tilted direction D, the handle support block 34 including the upper holder 28 can be formed by the use of a mold assembly of a simplified construction including two separable molds, resulting in an increase of the productivity.

The shield mounting area 32 has the cutout 37 defined therein for the passage of a screw handling tool as best shown in FIG. 5 and, therefore, in the presence of the cutout 47 the tool can be made access to each of the bosses 42 integral with the instrument mounting area 30 to connect the instrument panel unit 14 by means of the fastening members 68, resulting in an increase of the workability in fitting the instrument panel unit 14. Also, as shown in FIG. 2, with the windshield 16 fitted to the shield mounting area 32, after the instrument panel unit 14 has been fitted, the shield mounting area 32 and its neighborhood can be covered from above by the windshield 16 and, therefore, there is no possibility that the appearance of the motorcycle will be deteriorated.

Since as best shown in FIG. 10, the instrument mounting area 30 has the to-be-engaged portion 45 for receiving the engagement 52 rigid with the instrument panel unit 14 in a direction from the direction A perpendicular to the display surface 14a of the instrument panel unit 14 and, therefore, the instrument panel unit 14 can be regulated in position by means of a simple insertion of the engagement 52, resulting in an increase of the workability in fitting the instrument panel unit 14.

Since the entirety of the instrument panel mounting surface 31 of the instrument mounting area 30 best shown in FIG. 4 is covered by the instrument panel unit 14 best shown in FIG. 2 and the instrument panel mounting surface 31 best shown in FIG. 4 will not therefore be exposed to the outside, there is no need to work on removal of fins or burrs from the instrument panel mounting surface 31, resulting in an increase of the productivity.

Since as shown in FIG. 14, the shield mounting area 32 forms the covering mounting area to which the harness covering 29 is secured, the concurrent use of the shield mounting area 32 and the covering mounting area makes it possible to simplify the structure. Also, since the shield mounting area 32 has the windshield 16 and the harness covering 29 both fitted thereto by means of the common fitting members 74, the structure can be further simplified.

As shown in FIG. 2, since the rear end face 32a of the shield mounting area 32 and the gap delimited between the windshield 16 and an upper outer periphery of the instrument panel unit 14 are covered by the rear wall 60 of the harness covering 29, there is no need to work on removal of the fins or burrs from the shield mounting area 32 and, accordingly, not only is the productivity increased, but also the appearance of the neighbor of the instrument panel unit 14 becomes improved.

As shown in FIG. 1, although the instrument panel unit 14 moves together with the handlebar 12, since the weight thereof is reduced as a result of a reduction in number of component parts used and, also, since the instrument panel unit 14 is disposed above the front fork assembly 8, the moment of inertia during the handlebar 12 being maneuvered becomes small. Therefore, the handleability of the handlebar 12 can be sufficiently secured and, at the same time, since the instrument panel unit 14 is brought close to the motorcycle driver, the visibility of the instrument panel unit 14 increases.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

4 . . . Top bridge
8 . . . Front fork assembly
12 . . . Steering handlebar
14 . . . Instrument panel unit
16 . . . Windshield
26 . . . Lower holder
28 . . . Upper holder
29 . . . Harness covering
30 . . . Instrument mounting area
32 . . . Shield mounting area
34 . . . Handlebar support block
42 . . . Boss
45 . . . To-be-engaged portion
47 . . . Cutout
52 . . . Engagement
60 . . . Rear wall (Covering member)
72 . . . Damper
74 . . . Mounting member (Fastening member)
78 . . . Rubber nut

What is claimed is:

1. A handlebar support structure for sandwiching a steering handlebar between a lower holder and an upper holder, in which support structure comprises:
   the upper holder includes a shield mounting area formed integrally therewith for removably supporting a windshield fitted thereto, and
   the shield mounting area extends upwardly from a handlebar holding portion to be fitted to the lower holder.

2. The handlebar support structure as claimed in claim 1, in which the upper holder further includes an instrument mounting area formed integrally therewith for removably supporting an instrument panel unit fitted thereto.

3. The handlebar support structure of claim 2 is configured for a motorcycle, wherein the instrument mounting area includes a four sided hollow shaped opening with a to-be-engaged position having a guide groove extending into the hollow shape and configured to receive a portion of the instrument panel unit.

4. The handlebar support structure of claim 3 wherein the shield mounting area includes a pair of spaced connecting pieces extending outward from the instrument mounting area and respectively providing cantilevered mounting pieces configured to conform and connect with the windshield.

5. The handlebar support structure of claim 4 wherein the integrally formed upper holder is a one-piece construction and dimensioned for molding.

6. The handlebar support structure of claim 5 wherein the upper holder is formed from aluminium.

7. The handlebar support structure of claim 3 wherein the four sided hollow shaped opening has a trapezoidal shape.

8. The handlebar support structure as claimed in claim 2, in which the shield mounting area is positioned above the instrument mounting area.

9. The handlebar support structure as claimed in claim 8, in which the shield mounting area is positioned forward of the instrument mounting area.

10. The automotive vehicle as claimed in claim 2, in which the handlebar support structure is provided on a top bridge at an upper end portion of a front fork and the instrument panel unit is when viewed from a side, arranged on a line of extension of the front fork.

11. The handlebar support structure of claim 2 wherein the shield mounting area includes a pair of spaced connecting pieces extending outward from the instrument mounting area and respectively providing cantilevered mounting pieces configured to conform and connect with a windshield.

12. The handlebar support structure as claimed in claim 1, in which the shield mounting area altogether represent a shape converging toward a front along a direction for conforming to a predetermined forward tilted direction.

13. The handlebar support structure as claimed in claim 1, in which the upper holder has bolt insertion holes, into which bolts are inserted to connect the upper holder with the lower holder, and in which the shield mounting area has a mounting piece, to which the windshield is fitted, the mounting piece being positioned above the bolt insertion holes.

14. A handlebar support structure for sandwiching a steering handlebar between a lower holder and an upper holder, in which support structure comprises:
the upper holder includes an instrument mounting area formed integrally therewith for removably supporting an instrument panel unit fitted thereto, and a shield mounting area formed integrally therewith for removably supporting a windshield fitted thereto,
in which the instrument mounting area has a to-be-engaged portion engageable with an engagement, provided in the instrument panel unit, when such an engagement is inserted from a direction perpendicular to a display surface of the instrument panel unit.

15. The handlebar support structure as claimed in claim 14, in which the to-be-engaged portion is engageable with the engagement through a damper.

16. A handlebar support structure for sandwiching a steering handlebar between a lower holder and an upper holder, in which the support structure comprises:
the upper holder includes an instrument mounting area formed integrally therewith for removably supporting an instrument panel unit fitted thereto, and a shield mounting area formed integrally therewith for removably supporting a windshield fitted thereto,
in which the shield mounting area forms a covering mounting area on which a covering member is fitted.

17. The handlebar support structure as claimed in claim 16, in which the shield mounting area has a rear end face that is covered by the covering member.

18. An automotive vehicle which comprises:
the handlebar support structure as defined in claim 16;
the instrument panel unit mounted on the instrument mounting area; and
the windshield and the covering member being fitted to the shield mounting area by means of common fastening members.

19. A handlebar support structure for sandwiching a steering handlebar between a lower holder and an upper holder, in which support structure comprises:
the upper holder includes an instrument mounting area formed integrally therewith for removably supporting an instrument panel unit fitted thereto, and a shield mounting area formed integrally therewith for removably supporting a windshield fitted thereto,
in which the instrument mounting area has a boss to which the instrument panel unit is fitted by means of a fastening member inserted from above and in which the shield mounting area is positioned above the boss and has a cutout defined therein for passage of a tool therethrough for handling a screw.

20. A handlebar support structure for sandwiching a steering handlebar between a lower holder and an upper holder, in which the support structure comprises:
the upper holder includes an instrument mounting area formed integrally therewith for removably supporting an instrument panel unit fitted thereto, and a shield mounting area formed integrally therewith for removably supporting a windshield fitted thereto,
in which the instrument mounting area has an instrument panel mounting surface having its entire surface configured to be covered by the instrument panel unit.

21. A handlebar support structure for sandwiching a steering handlebar between a lower holder and an upper holder, in which support structure comprises:
the upper holder includes an instrument mounting area formed integrally therewith for removably supporting an instrument panel unit fitted thereto,
in which the instrument mounting area has a to-be-engaged portion engageable with an engagement, provided in the instrument panel unit, when such an engagement is inserted from a direction perpendicular to a display surface of the instrument panel unit.

22. A handlebar support structure for sandwiching a steering handlebar between a lower holder and an upper holder, in which support structure comprises:
the upper holder includes a shield mounting area formed integrally therewith for removably supporting a windshield fitted thereto,
in which the shield mounting area forms a covering mounting area on which a covering member is fitted.

* * * * *